Figure 1:
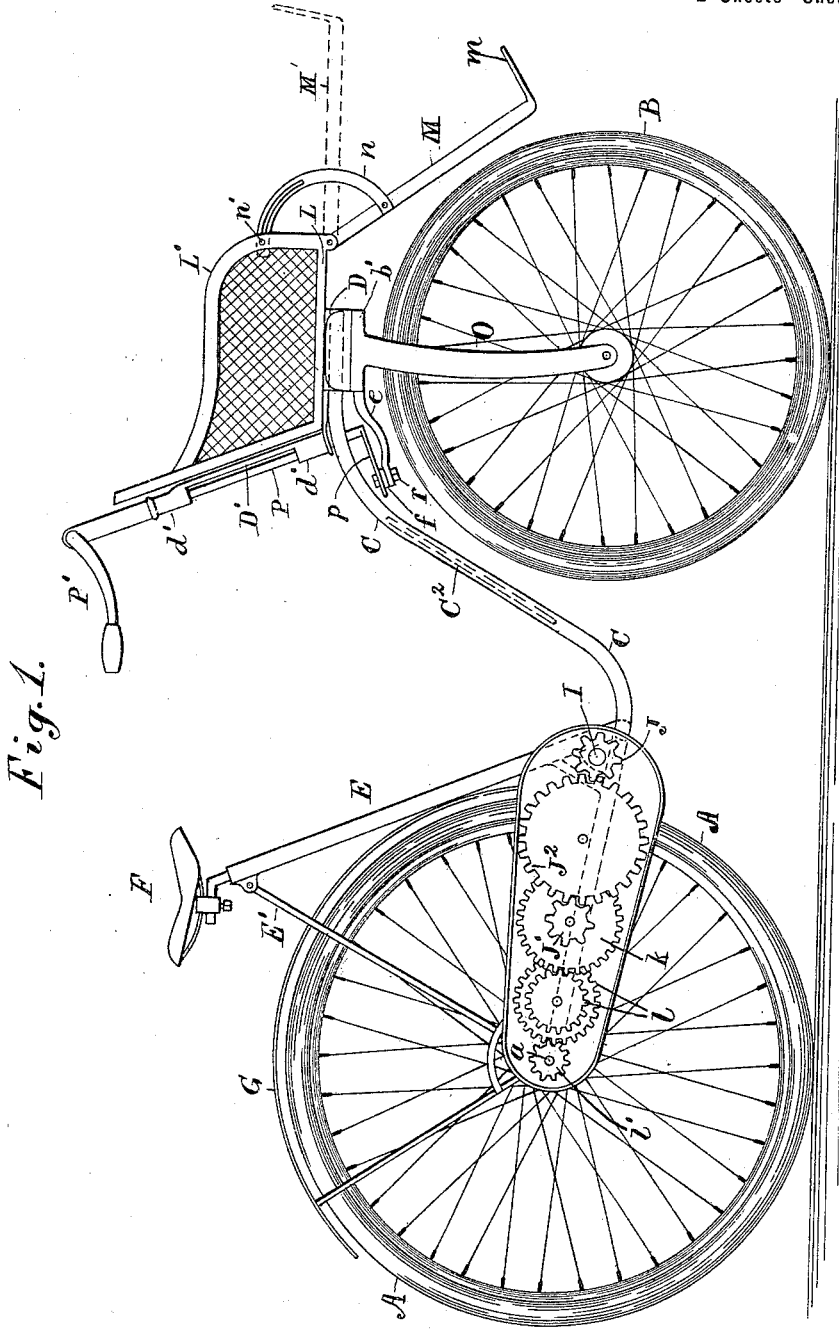

No. 622,500. Patented Apr. 4, 1899.
A. C. KUSTER.
CYCLE PERAMBULATOR.
(Application filed June 3, 1898.)
(No Model.) 2 Sheets—Sheet 2.

Attest:
Jacob Marx
Edw. F. Kinsey.

Inventor.
August C. Kuster, per
Thomas S. Crane, Atty

UNITED STATES PATENT OFFICE.

AUGUST C. KUSTER, OF NEW YORK, N. Y.

CYCLE-PERAMBULATOR.

SPECIFICATION forming part of Letters Patent No. 622,500, dated April 4, 1899.

Application filed June 3, 1898. Serial No. 682,437. (No model.)

*To all whom it may concern:*

Be it known that I, AUGUST C. KUSTER, a citizen of the United States, residing at New York, (Brooklyn,) county of Kings, State of New York, have invented certain new and useful Improvements in Cycle-Perambulators, fully described and represented in the following specification and the accompanying drawings, forming a part of the same.

The present invention relates to a cycle-perambulator upon which the operator can carry an infant, an invalid, or other passenger safely, and is especially adapted for use by nurse-maids in the place of a baby-carriage or perambulator to take an infant or small child out to air.

The perambulator is provided with one wheel in the rear and two wheels at the front, and the rear wheel, with its frame and driving apparatus, may be made the same as any type of bicycle.

The invention differs from an ordinary bicycle in having two wheels at the front which are pivoted in separate forks and provided with connections for turning them simultaneously and in having a passenger-seat over such wheels attached rigidly to the front part of the frame. The passenger-seat is provided with arms and may be adapted for both adults and infants by providing its front edge with a hinged board having a foot-rest at the bottom, which board may be adjusted at a level with the seat when required to form a bed for the infant. The foot-rest at the bottom of the board serves to form the foot of the bed when the board is thus raised. When not used as a bed, the board may be adjusted at any position for the comfort of the passenger. To use the rear wheel for driving in the usual manner, a saddle is provided over such wheel, and pedals, with suitable gearing, are mounted upon the frame, and the front wheels are therefore used for steering. If such steering-wheels were mounted in a single pivoted frame and turned when steering the machine, the latter would lose its stability when the wheels were turned at an angle with the line of the frame; but I secure the desired stability and maintain the support of the machine upon three fixed points by mounting the steering-wheels in separate pivoted frames and connecting them with the handle-bars, so as to turn them simultaneously. This construction is facilitated by making the frame principally of two frame-bars which are extended by the sides of the rear wheel and upwardly and forwardly over the front wheels, where they are connected together by a platform, to which the seat may be attached. Such platform has upon its under side a raceway for balls on each side of the center line, and the forks for the two front wheels are therefore provided with raceways and balls which are pivoted to the raceways upon the platform, so as to turn each fork upon a fixed axis, which maintains the lower part of the wheel at a fixed point beneath the seat. The seat is thus securely supported upon two fixed points in whatever direction the wheels may be turned. By the use of the two lower frame-bars to connect the rear wheel with the platform for the passenger-seat I provide a drop-frame adapted for use by women and possessed of ample strength to carry two pasengers.

The annexed drawings illustrate a cycle embodying my improvements.

Figure 2:
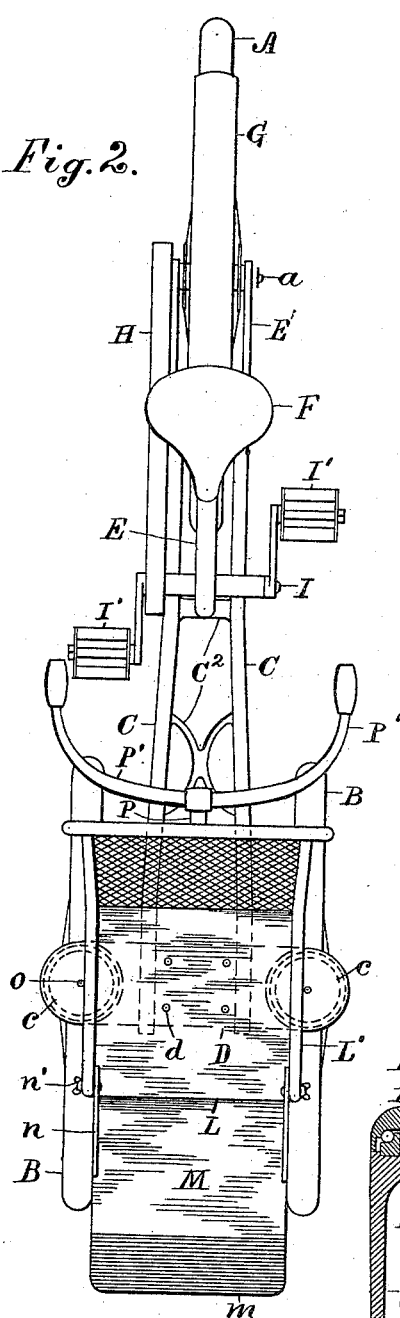
Figure 4:
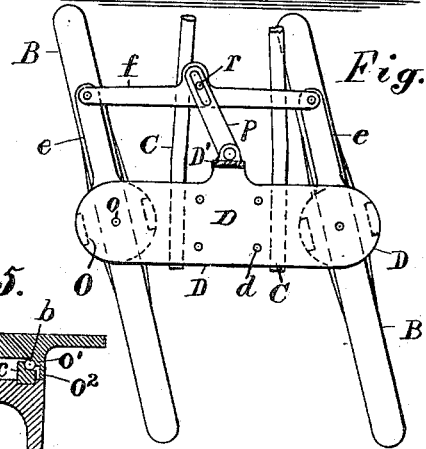
Figure 5:
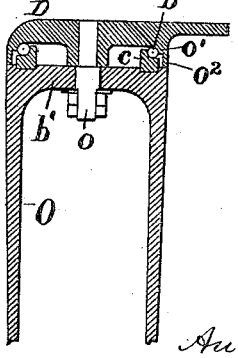

Figure 1 is a side elevation of the machine; Fig. 2, a plan and Fig. 3 a front view showing the drop-frame without the rear wheel and its driving-gear. Fig. 4 is a plan of the front platform with the front ends of the frame-bars and the lower end of the steering-shaft and its connections, the two steering-wheels being turned to the left. Fig. 5 is a vertical section through the length of the platform of one of the turn-tables with the upper part of the fork pivoted thereon.

A designates the rear or driving wheel, and B the front steering-wheels.

C are the frame-bars, extended by the sides of the rear wheel to the journals for the rear axle and bent upwardly and forwardly to the platform D over the front wheels.

E is the post for the operator's saddle F, and E' the rear braces for such post.

G is the usual guard over the rear wheel, and H a casing containing a train of cog-wheels to connect the crank-shaft I with the rear axle $a$. The shaft I is provided with pedals I' and with a pinion J, which meshes with a pinion J' through an intermediate gear $J^2$. The pinion J' is thus driven at the same rate as the crank-shaft. Multiplying-gears $k$ and $l$ connect the pinion J' with the pinion $l'$ upon the rear wheel, and such gears may be varied to produce any proportion between the speed of the crank-shaft and the driving-wheel.

By furnishing the crank-shaft with a small pinion J instead of one of the multiplying-gears I am enabled to project the casing but little, if any, beyond the base of the seat-post E, and I thus avoid crowding the space within the drop-frame through which the rider places the foot to reach the pedal when mounting. The contraction of such space greatly increases the difficulty of mounting, and the shifting of the first multiplying-wheel to the middle of the gear-case, as shown in Fig. 1, is thus a material improvement.

Figure 3:
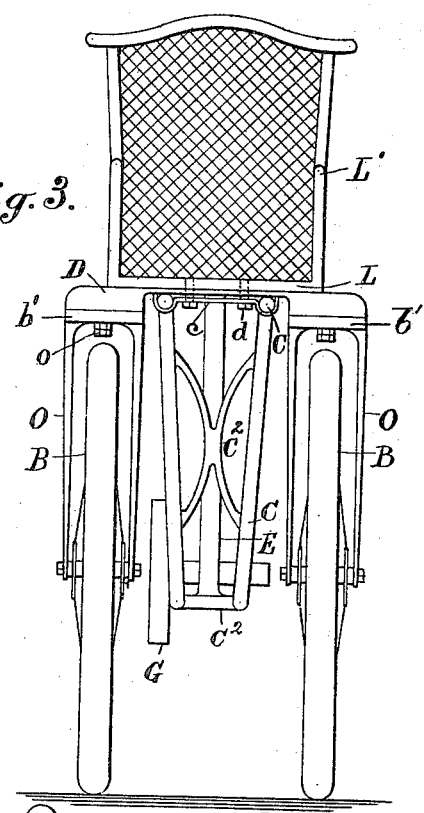

The frame-bars C are diverged toward the platform over the front wheels and tied by lateral braces C', as shown in Figs. 2 and 3, and may be brazed to the platform or fastened by a suitable clamping-plate $c$ and bolts $d$, as shown in Fig. 3.

A seat L is supported upon the platform and is shown secured by the bolts $d$, and a board M is hinged at the front edge of the seat and provided with foot-rest $m$. The seat is provided with arms L', and the board is connected with the arms by curved links $n$ and clamp-screws $n'$, adapted to raise or adjust the board to a horizontal position, as indicated by the dotted lines M' in Fig. 1.

The opposite ends of the platform are provided upon the under side with turn-tables, upon which forks O are pivoted by central bolts $o$. Each turn-table consists of a raceway $o'$ for a set of antifriction-balls $b$ and a marginal flange $o^2$ to exclude the dirt from the raceway.

The top of the fork is formed with a circular plate $b'$, carrying a raceway $c$ to rest upon the balls $b$, and thus furnishes a firm base for the fork. Arms $e$ are projected from the plates $b'$ and connected by a link $f$ to turn the forks simultaneously. A brace D' is extended upwardly from the platform D in the rear of the seat and provided with bearings $d'$ for the steering-shaft P, which has the handle-bar P' upon the top.

A slotted crank $p$ is projected from the lower end of the steering-shaft to a bolt $r$ upon the link $f$, and the handle-bar is thus connected to turn both of the steering-wheels simultaneously.

I am aware that it is old to mount a receptacle for parcels between two steering-wheels and to connect the same with a frame like that of a bicycle having a driving-wheel at the rear; but in such constructions the pivotal support of the wheel is at the side of the same and the entire wheel is swung around in the arc of a circle when the handle-bar is moved to steer the machine. A similar construction has been used in a four-wheeled cycle; but the connection of my steering-wheels with the platform D is of a wholly different character, as the pivotal support of each steering-wheel is directly above the center of the wheel, so that the point of support upon the ground is fixed in relation to such pivotal support and is entirely unchanged when the wheels are turned in the act of steering. The movement of the wheels in steering thus offers less resistance to the operator than with previous constructions. It will be observed by reference to Figs. 3 and 4 that the lower parts of the steering-wheels contact with the floor or ground directly underneath the bolts $o$ upon the platform D whatever the adjustment of the steering-wheels, and such result can only be obtained by arranging the pivot of the fork directly above the center of the wheel, as in my construction.

The wheels B may in the construction of the machine be spaced at any suitable distance apart to furnish the required stability, thus making the machine suitable to the use for which it is intended.

The passenger-seat shown in the drawings, with the hinged foot-board, is in proportions to carry a small child; but the seat is detachable from the platform, and the machine may thus be provided with a seat to carry an adult or an invalid of any age. The same machine may be furnished with more than one seat, so that it may be used for various purposes in the same family.

I claim—

A suitable framework, a rear supporting-wheel journaled therein, a platform to which the forward end of the frame is secured, the forks pivoted to the ends of the platform, and the front steering-wheels journaled in the forks, combined with a seat which is mounted upon the platform directly over the center of the front wheels, suitable bearings secured to the rear of the seat, a steering-post mounted in said bearings mounted upon the seat, a crank on the lower end of the steering-post, arms projecting rearwardly from the upper ends of the post, and a connecting-rod for uniting the rear ends of the arms, and with which the crank makes connection, substantially as described.

In testimony whereof I have hereunto set my hand in the presence of two subscribing witnesses.

AUGUST C. KUSTER.

Witnesses:
EDWARD F. KINSEY,
THOMAS S. CRANE.